United States Patent [19]
Lee et al.

[11] Patent Number: 5,719,830
[45] Date of Patent: Feb. 17, 1998

[54] HIGH-DENSITY MAGNETO-OPTICAL DISK APPARATUS

[75] Inventors: Yong-jae Lee, Uiwang-city; Kyo-bang Chung, Anyang-city, both of Rep. of Korea

[73] Assignee: Samsung Electronics Co., Ltd., Kyungki-Do, Rep. of Korea

[21] Appl. No.: 675,054

[22] Filed: Jul. 3, 1996

[30] Foreign Application Priority Data

Jul. 6, 1995 [KR] Rep. of Korea .................. 95-19815

[51] Int. Cl.$^6$ .................. G11B 11/00; G11B 7/00
[52] U.S. Cl. .................. 369/13; 369/109
[58] Field of Search .................. 369/13, 112, 116, 369/110, 109, 44.37

[56] References Cited

U.S. PATENT DOCUMENTS

| | | | |
|---|---|---|---|
| 4,955,006 | 9/1990 | Fukushima et al. | 369/13 |
| 5,446,565 | 8/1995 | Komma et al. | 369/112 |
| 5,539,718 | 7/1996 | Hoshi et al. | 369/13 |

FOREIGN PATENT DOCUMENTS 1316725  12/1989  Japan.

Primary Examiner—Tan Dinh
Attorney, Agent, or Firm—Sughrue, Mion, Zinn, Macpeak & Seas, PLLC

[57] ABSTRACT

A high-density magneto-optical disk apparatus is provided for removing a cross talk between signals of an adjacent track with respect to a track to be reproduced during reproduction of a signal recorded on a magneto-optical disk. In the case that a track pitch is narrowed for high-density recording in a magneto-optical disk apparatus, a cross talk occurs between a track to be detected and an adjacent track thereto. The magneto-optical disk apparatus uses a phase modulation optical element to form an optical spot having a linear polarizing state in a reproduction track and a circular polarizing state in an adjacent track, on the recording surface of the magneto-optical disk. Accordingly, although a track pitch is considerably reduced compared with the optical spot, a signal interference effect, that is, a cross talk between tracks can be removed to thereby provide a high-density magneto-optical disk.

3 Claims, 5 Drawing Sheets

FIG. 5A    FIG. 5B
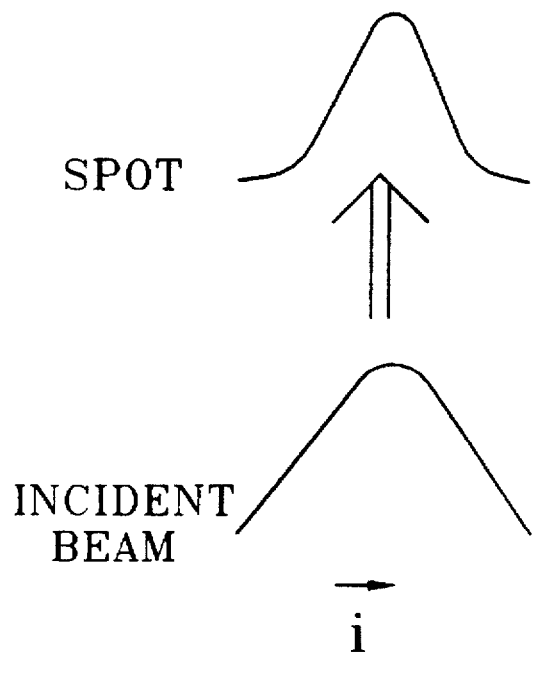
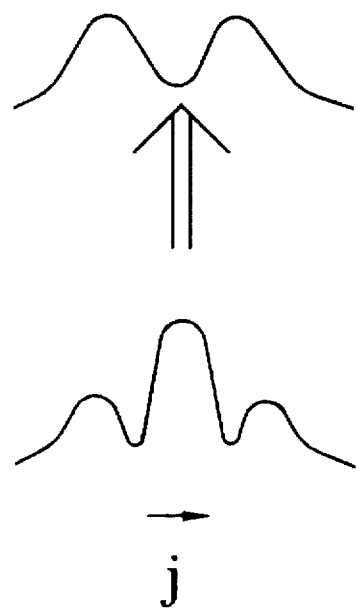
FIG. 6
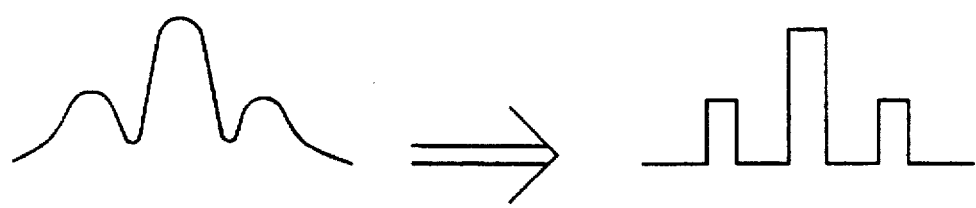

HIGH-DENSITY MAGNETO-OPTICAL DISK APPARATUS

BACKGROUND OF THE INVENTION

The present invention relates to a magneto-optical disk apparatus, and, more particularly, to a high-density magneto-optical disk apparatus for removing a cross talk between signals of an adjacent track with respect to a track to be reproduced during reproduction of a signal recorded on a magneto-optical disk.

In general, with respect to a magneto-optical disk apparatus, there have been proposed various methods for high-density recording and reproduction, which correspond to a short wave optical source, a reduction of a track pitch and a land/groove recording method. However, the above-described prior art has a problem in that a large amount of cross talk occurs between tracks with respect to an adjacent track from a reproduction track, by minimizing a track pitch compared with an optical spot to pursue a high-density recording.

A conventional magneto-optical disk apparatus using an optical head system stores digital information in pits on a disk, projects a laser beam and recognizes the digital information on the disk by an optical diode current due to the laser beam picked up by an object lens.

FIG. 1 shows the structure of a conventional magneto-optical disk apparatus. Prior to describing the present invention, an optical head system of the conventional magneto-optical disk apparatus will be described below with reference to FIG. 1.

A beam emitted from a laser diode 11 is converted into a parallel beam by a collimating lens 12. The parallel beam is transmitted to an object lens 15 via a beam shaping prism 13 and a first partial polarizing beam splitter (hereinafter, called PPBS) 14 and focussed on a spot on a disk 16 via the object lens 15. As shown in FIG. 1, the beam reflected from the disk 16 is transmitted to an error detector 18 and a signal detector 20 via the object lens 15 and the first PPBS 14, and a second PPBS 17. The signal detector 20 includes a polarizing beam splitter (hereinafter, called PBS) 21, and first and second photodiodes 23 and 25 for detecting a radio frequency (RF) signal. The signal detector 20 obtains a magneto-optical signal from a difference between first and second RF signals detected by the first and second photodiodes 23 and 25, respectively.

In such a conventional magneto-optical disk apparatus, when a track pitch is narrowed to pursue a high-density recording, a signal cross talk occurs between a detection track and an adjacent track. That is, when a digital signal recorded on a recording medium, for example, a pit is reproduced, a cross talk phenomenon which interferes a signal to be reproduced with another signal of a pit of a track adjacent to another track to be reproduced occurs, to thereby affect a reproduction signal.

SUMMARY OF THE INVENTION

To solve the above problem, it is an object of the present invention to provide a high-density magneto-optical disk apparatus including a phase modulation optical element capable of controlling a polarizing state of an optical spot and removing a cross talk between tracks by making the polarizing state into a linear polarizing state in the case where the optical spot is formed on a track to be reproduced and by making the polarizing state into a circular polarizing state in the case where the optical spot is formed on a portion sitting over adjacent tracks.

To accomplish the above object of the present invention, there is provided a high-density magneto-optical disk apparatus comprising a phase modulation optical element for varying the polarizing state of an optical spot applied to the recording surface of a disk according to a signal detection position.

BRIEF DESCRIPTION OF THE DRAWINGS

The preferred embodiments are described with reference to the drawings, wherein:

FIGS. 5A and 5B are conceptual diagrams for explaining an optical spot shape with respect to an incident beam of FIG. 3 in more detail.

FIG. 6 is a conceptual diagram showing approximation to produce an incident wave as shown in FIG. 5B.

DETAILED DESCRIPTION OF THE PREFERRED EMBODIMENT

A preferred embodiment of the present invention will be described below in more detail with reference to the accompanying drawings.

Figure 2A:
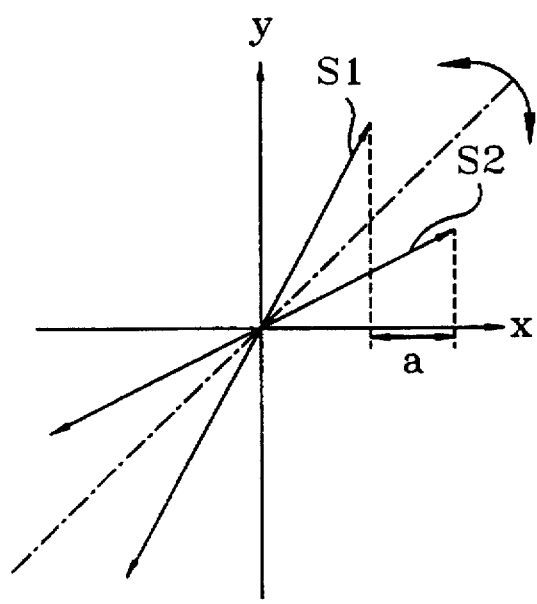
FIGS. 2A and 2B are conceptual diagrams for explaining a linear polarization and a circular polarization of a beam reflected from the recording surface of a magneto-optical disk to be used in the present invention.
Figure 2B:
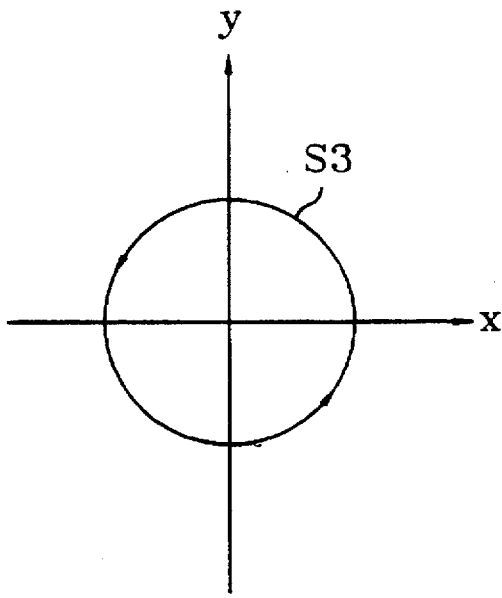

In FIGS. 2A and 2B showing conceptual diagrams for explaining a linear polarization and a circular polarization of a beam reflected from the recording surface of a magneto-optical disk to be used in the present invention, the co-ordinate system having a horizontal axis x and a vertical axis y indicates a surface perpendicular to light transmission direction. FIG. 2A is a conceptual diagram for explaining a linear polarizing state. As can be seen from FIG. 2A, a magneto-optical signal is detected by varying a difference between the polarizing states of a recording mark portion S1 and a non-recording mark portion S2, that is, a symbol "a" is converted into a light quantity difference by a light detector (not shown). The portions S1 and S2 are rotated according to magnetization direction. FIG. 2B is a conceptual diagram for explaining a circular polarizing state. When compared with FIG. 2A, since polarization is accomplished by rotation in the form of a circle as designated with a symbol S3, a light quantity difference cannot be detected. Therefore, a signal cannot be detected from a recording mark portion. Using the above-described principle, an apparatus according to the present invention is made.

Figure 1:
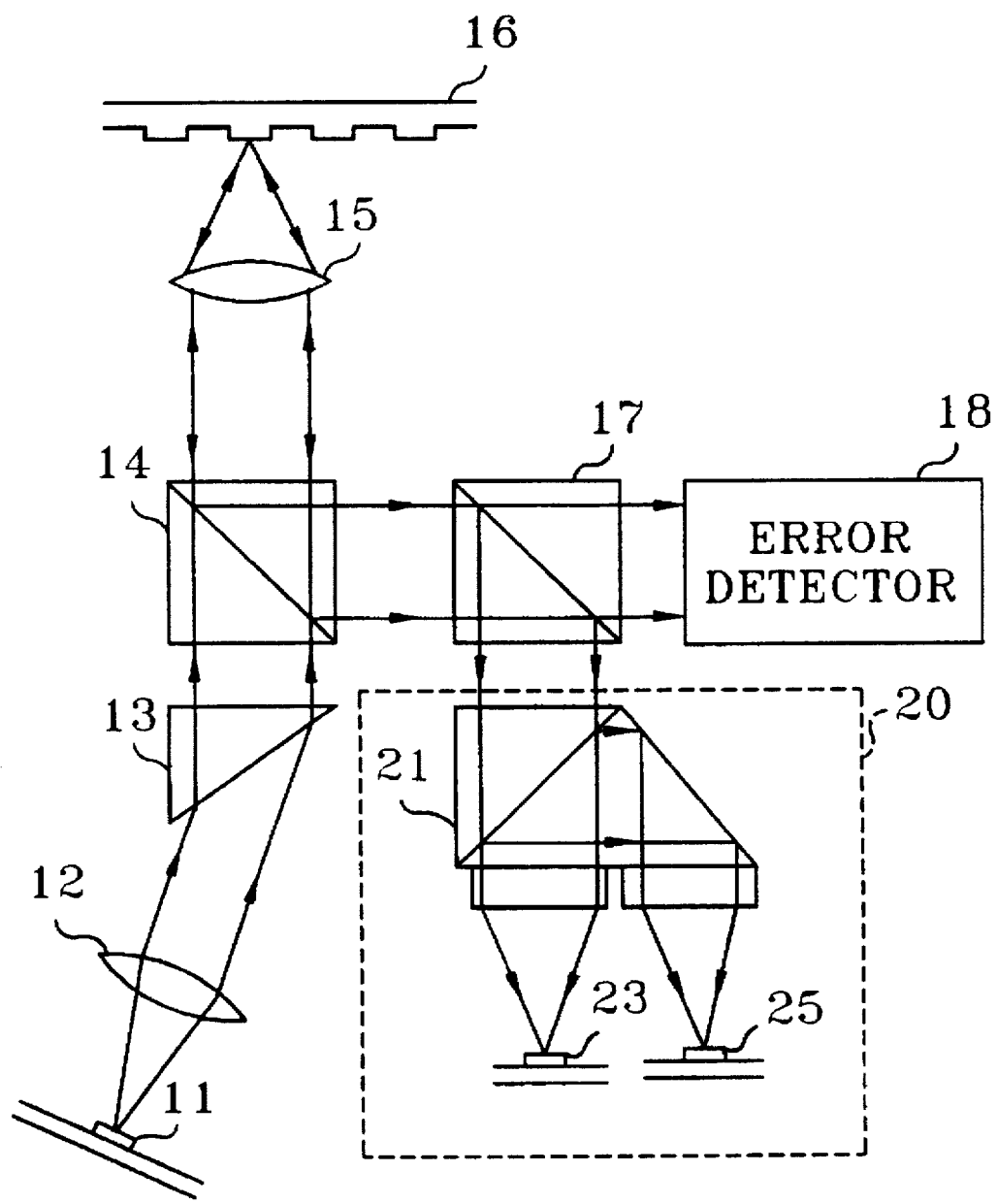
FIG. 1 shows the structure of a conventional magneto-optical disk apparatus.
Figure 3:
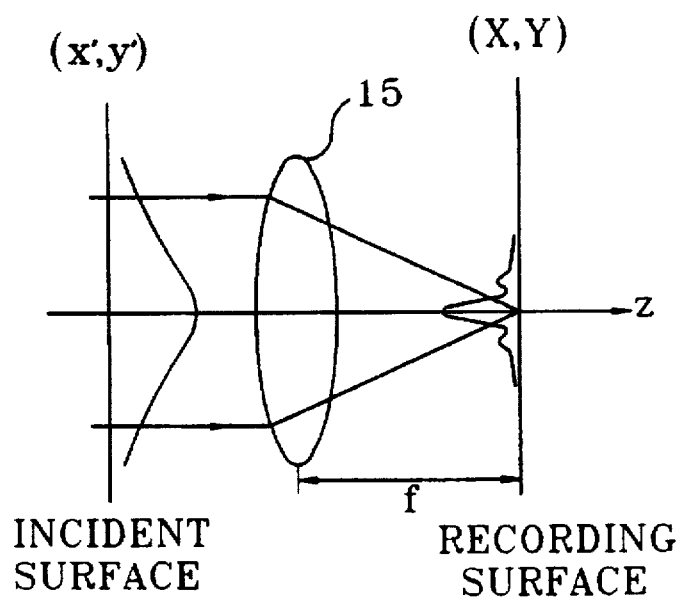
FIG. 3 is a conceptual diagram showing an electric field distribution of an incident surface of a magneto-optical disk apparatus to be used in the present invention and an electrical field distribution at a recording surface passing through an object lens 15 in the conventional magneto-optical disk apparatus shown in FIG. 1.

FIG. 3 is a conceptual diagram showing an electric field distribution of an incident surface of a magneto-optical disk apparatus to be used in the present invention and an electrical field distribution at a recording surface passing through an object lens 15 in the conventional magneto-optical disk apparatus shown in FIG. 1. The electric field distribution of an incident surface in FIG. 3 can be expressed as the following equation (1).

$$\vec{iE_{in}}(x',y') = E_{in}{}^{x'}(x',y')\vec{ii} + E_{in}{}^{y'}(x',y')\vec{ij} \quad (1)$$

The electric field distribution of a recording surface in FIG. 3 can be expressed as the following equation (2).

$$\vec{iE_{out}}(x,y) = E_{out}{}^{x}(x,y)\vec{ii} + E_{out}{}^{y}(x,y)\vec{ij} \quad (2)$$

Here, a Fourier transform is established between the above equations (1) and (2). By generalization of the above equations (1) and (2), the following equation (3) can be obtained.

$$\vec{iE_{out}}(x,y) = \iint \vec{iE_{in}}(x',y') \cdot e^{-2\pi i(xx'+yy')} dx'dy' \quad (3)$$

A relationship between actual coordinate systems (X, Y) and (x, y) is expressed as the following equations: x=X/λf and y=Y/λf, in which λ represents a wavelength and f represents a focal length of an object lens.

Here, an inverse Fourier transform is also established in the following equation (4).

$$\vec{iE_{in}}(x',y') = \iint \vec{iE_{out}}(x,y) \cdot e^{2\pi i(xx'+yy')} dxdy \quad (4)$$

Figure 4A:
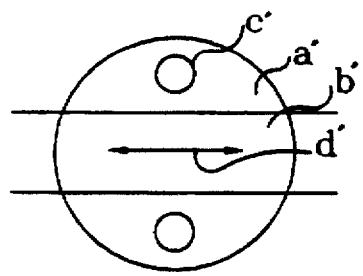
FIGS. 4A through 4D are conceptual diagrams showing the polarizing state and the electric field distribution of the optical spot.
Figure 4B:
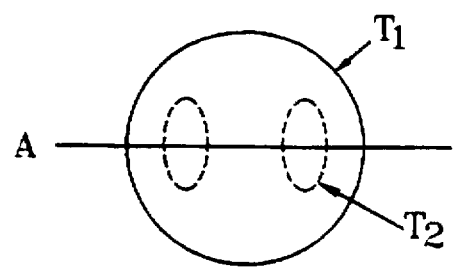
Figure 4C:
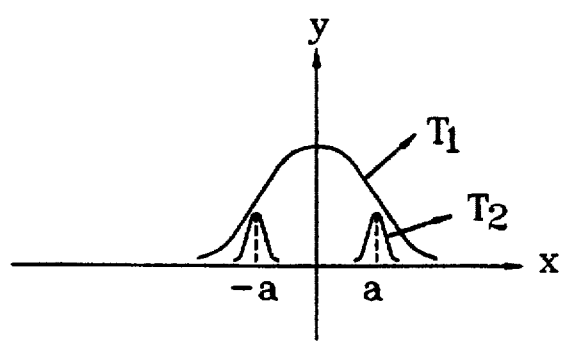
Figure 4D:
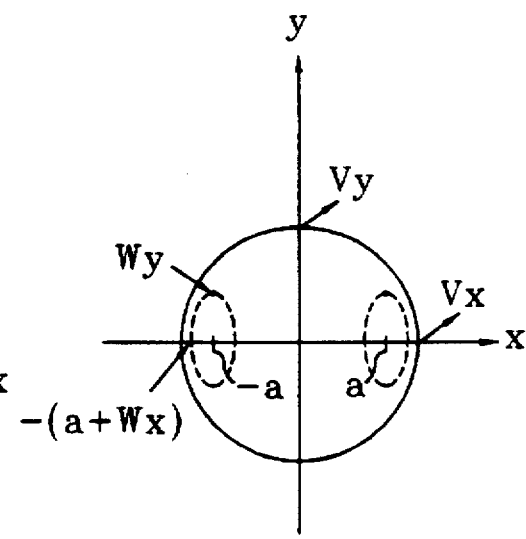

FIGS. 4A through 4D are conceptual diagrams showing the polarizing state and the electric field distribution of the optical spot. FIG. 4A shows the polarizing state of the optical spot embodied in the present invention. As shown in FIG. 4A, a linear polarizing state d' is formed on a reproduction track b' and a circular polarizing state c' is formed on an adjacent track a'. FIG. 4B is a top view obtained by overlooking an electric field distribution of an optical spot. FIG. 4C is a conceptual diagram showing a cross-sectional distribution of FIG. 4B. In FIG. 4C, the horizontal axis represents an x-direction and the vertical axis represents a y-direction. A curve T1 represents an electric field distribution $E_{out}{}^{x}(x,y)$ of the x-component and a curve T2 represents an electric field distribution $E_{out}{}^{y}(x,y)$ of the y-component. As shown in FIG. 4D, the optical spot is formed as a linear polarizing state on a reproduction track, and as a circular polarizing state of a waveform having a phase difference of ±π/2 in the x and y-components, to thereby accomplish the object of the invention. The following equations (5) and (6) should be met to have the polarizing state as shown in FIG. 4D.

$$E_{out}^{x}(x, y) = E_0{}^{x} \cdot e^{-(\frac{x^2}{v_x{}^2} + \frac{y^2}{v_y{}^2})} \quad (5)$$

$$E_{out}^{y}(x, y) = E_0{}^{y} \cdot [e^{-(\frac{(x-a)^2}{w_x{}^2} + \frac{y^2}{w_y{}^2})} + e^{-(\frac{(x+a)^2}{w_x{}^2} + \frac{y^2}{w_y{}^2})}] \cdot e^{j\frac{\pi}{2}} \quad (6)$$

Here, $v_x$ and $v_y$ represent the magnitude of an optical spot, respectively. Also, $E_0{}^{x}$ and $E_0{}^{y}$ represent the intensity of an electric field, respectively. To obtain the electric field distribution as represented as the above equations (5) and (6), the incident beam distribution $\vec{E_{in}}(x',y')$ of an object lens can be expressed as an inverse Fourier transform of the equation (4). If the above equations (5) and (6) are inversely Fourier transformed, the following equations (7) and (8) are obtained.

$$\vec{E_{in}^{x}}(x', y') = E_0{}^{x} \cdot e^{-(\frac{x'^2}{t_x{}^2} + \frac{y'^2}{t_y{}^2})} \quad (7)$$

$$\vec{E_{in}^{y}}(x, y) = iE_0{}^{y} [e^{-(\frac{x'^2}{t_x{}^2} + \frac{y'^2}{t_y{}^2})} \cdot e^{iax' \cdot 2\pi} + e^{-(\frac{x'^2}{t_x{}^2} + \frac{y'^2}{t_y{}^2})} e^{-iax' \cdot 2\pi}] = \quad (8)$$

$$2iE_0{}^{y} \cos 2\pi ax' \cdot e^{-(\frac{x'^2}{t_x{}^2} + \frac{y'^2}{t_y{}^2})}$$

In other words, an x'-component of the electric field distribution of the beam incident to the objective lens is modulated into a Gaussian distribution and a y'-component is modulated into a cosine function distribution in addition to the Gaussian distribution. If the phase of the y'-component differs by π/2 from that of the x'-component, a desired polarizing state can be obtained from a recording surface. Thus, when a magneto-optical signal is reproduced using the spot, a signal interference effect between the tracks, that is, a cross talk can be reduced.

FIGS. 5A and 5B are conceptual diagrams for explaining an optical spot shape with respect to an incident beam of FIG. 3 in more detail. FIG. 5A is a conceptual diagram showing an x-component optical wave of an optical spot according to the pattern of the incident beam as shown in FIG. 4B, and FIG. 5B is a conceptual diagram showing a y-component optical wave thereof. If an incident beam is applied in the form appropriate for the equations (7) and (8), the incident beam is simultaneously formed as an optical spot on a reproduction track as shown in FIGS. 5A and 5B. Therefore, a linear polarizing state is formed on the reproduction track and a circular polarizing state is formed on the adjacent track thereof as shown in FIG. 4A.

FIG. 6 is a conceptual diagram showing an approximation to produce an incident wave as shown in FIG. 5B. It is difficult to produce an optical element of a cosine distribution modulation pattern in obtaining a y-component optical wave of the incident beam as shown in the lefthand diagram of FIG. 6. Therefore, the present invention obtains an approximate value of a rectangular wave pattern as shown in the righthand diagram of FIG. 6, to produce a phase modulation optical element.

Figure 7A:
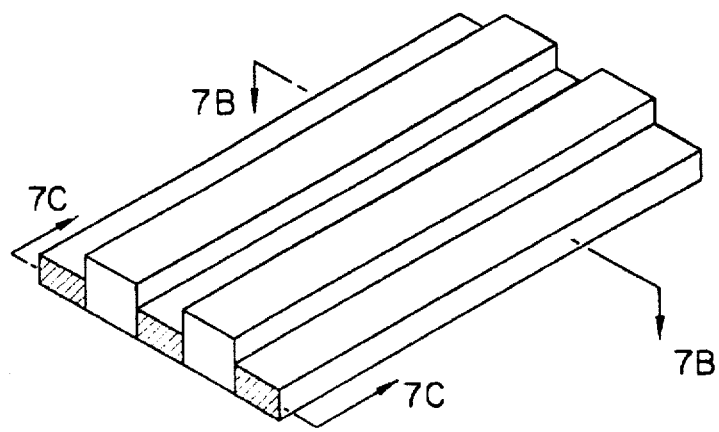
FIGS. 7A through 7C show the structure of a phase modulation element according to the present invention, respectively.
Figure 7B:
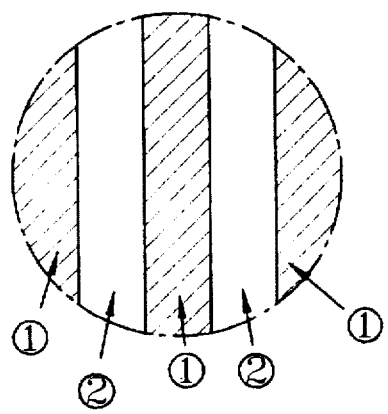
Figure 7C:
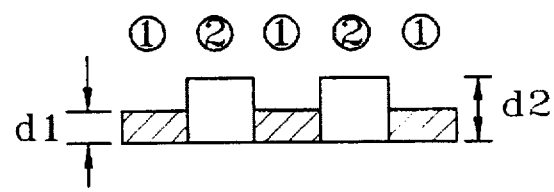

FIGS. 7A through 7C show the structure of a phase modulation element according to the present invention, respectively. FIG. 7A is a perspective view showing a phase modulation optical element, FIG. 7B is a sectional view cut along a line 7B—7B, and FIG. 7C is a sectional view cut along a line 7C—7C. The phase modulation optical element applied to the present invention is produced by alternately joining a birefringence material having different refractive indices as shown reference numerals ① and ② in FIGS. 7B and 7C. The width of the birefringence material of ① is d1, while the width of the birefringence material of ② is d2. Here, the two birefringence materials can be represented as $n_1{}^{x} < n_1{}^{y}$ in case of the birefringence material ①, and $n_2{}^{x} < n_2{}^{y}$ in case of the birefringence material ②, which meet the following equations (9), (10) and (11).

$$d_1(n_1{}^{x} - n_1{}^{y}) = \frac{\lambda}{4} \quad (9)$$

$$d_2(n_2{}^{x} - n_2{}^{y}) = -\frac{\lambda}{4} \quad (10)$$

$$(n_1{}^{x} - 1)d_1 = (n_2{}^{x} - 1)d_2 \quad (11)$$

The state of an electric field of a beam passing through a phase modulation optical element which is obtained by alternately joining the above-described birefringence materials is modulated as follows.

The electric field distribution is expressed as the following equations (12) and (13) after passing through the birefringence material ① as shown in FIGS. 7B and 7C.

$$\vec{E}_x = E_x(x, y) \cdot e^{-ikz} \tag{12}$$

$$\vec{E}_y = E_y(x, y) \cdot e^{-ikz + ik\frac{\lambda}{4}} = iE_y(x, y) \cdot e^{-ikz} \tag{13}$$

The electric field distribution is expressed as the following equations (14) and (15) after passing through the birefringence material ② as shown in FIGS. 7B and 7C.

$$\vec{E}_x = E_x(x, y) \cdot e^{-ikz} \tag{14}$$

$$\vec{E}_y = E_y(x, y) \cdot e^{-ikz + ik\frac{\lambda}{4}} = -iE_y(x, y) \cdot e^{-ikz} \tag{15}$$

The above equations (12) through (15) are same as the above equations (7) and (8) except for the cosine modulation. Here, the electric field distribution of the $E_y$ component is not modulated into a cosine function, but is modulated into a rectangular function. As shown in FIG. 6, the rectangular function is easier than the cosine function in embodying an optical element. Since the distribution of the rectangular function is not greatly discrepant from the that of the cosine function, the polarizing state as shown in FIG. 4A can be formed using the distribution of the rectangular function.

As described above, the magneto-optical disk apparatus according to the present invention uses a phase modulation optical element to form an optical spot having a linear polarizing state in a reproduction track and a circular polarizing state in an adjacent track, on the recording surface of the magneto-optical disk. Accordingly, although a track pitch is considerably reduced compared with the optical spot, a signal interference effect, that is, a cross talk between tracks can be removed to thereby provide a high-density magneto-optical disk.

While only certain embodiments of the invention have been specifically described herein, it will apparent that numerous modifications may be made thereto without departing from the spirit and scope of the invention.

What is claimed is:

1. A high-density magneto-optical disk apparatus comprising a phase modulation optical element for varying a polarizing state of an optical spot applied to a recording surface of a disk according to a signal detection position, wherein said phase modulation optical element comprises alternately joined birefringence materials which have properties of controlling the polarizing state of the optical spot and by forming a linear polarizing state on a reproduction track and a circular polarizing state on an adjacent track.

2. The high-density magneto-optical disk apparatus according to claim 1, wherein said phase modulation optical element is formed of a material having a property of embodying a y-component of the optical spot into a rectangular function and a birefringence material having a property of embodying an x-component of the optical spot into a plane wave.

3. The high-density magneto-optical disk apparatus according to claim 2, wherein the equations $$d_1(n_1^x - n_1^y) = \frac{\lambda}{4}, \text{ and } d_2(n_2^x - n_2^y) = -\frac{\lambda}{4},$$

meet the y-component of the optical spot applied to the recording surface, and the equation $(n_1^x-1)d_1=(n_2^x-1)d_2$, satisfies the x-component of the optical spot applied thereto, in which variables $n_1^x$, $n_1^y$, $n_2^x$ and $n_2^y$ represent refractive indices with respect to the x- and y-components of the phase modulation optical element, and satisfy inequalities $n_1^x<n_1^y$ and $n_2^x>n_2^y$, $d_1$ and $d_2$ represent a thickness of said phase modulation optical element, and $\lambda$ represents a wavelength thereof.

* * * * *